United States Patent Office 3,316,180
Patented Apr. 25, 1967

3,316,180
CHLORINATED NAPHTHOTRIAZOLE BRIGHTENERS FOR POLYALKYLENE FIBERS AND PLASTICS
Albert F. Strobel, Delmar, and Sigmund C. Catino, Castleton, N.Y., assignors to General Aniline & Film Corporation, New York, N.Y., a corporation of Delaware
No Drawing. Filed July 30, 1963, Ser. No. 299,685
6 Claims. (Cl. 252—301.2)

This invention relates to polyalkylene fibers and plastic compositions containing chlorinated naphthotriazole brighteners.

Polymers of the α-olefins such as polyethylene, polypropylene and polybutene-1 have recently become extremely promising for the commercial production of textile fibers. Due to the general inertness and the extremely hydrophobic characteristics, these polymers have presented serious problems when attempts are made to dye them or treat them with agents having actinic activity, such as ultraviolet absorbers or brightening agents.

It is the principal object of the present invention to provide polyalkylene fabrics and plastic compositions dyed with brighteners which do not bloom out on ageing and which have outstanding brightness and excellent light fastness on exposure to actinic radiation. Another object is to provide a dyed polyolefin fabric, fiber or film with a brightener to yield compositions which have outstanding brightness and high stability when exposed to actinic radiation.

Other advantages will become more clearly manifest from the following description.

We have discovered that among the large class of various types of fluorescing optical bleaching or whitening agents available for fine fabrics, chlorinated naphthotriazoles are exceptionally unique as whitening agents for polyalkylene fabrics, fibers and films with high stability upon exposure to ultraviolet light radiation. In other words, we have discovered that chlorinated naphthotriazoles are readily compatible with fabrics, fibers and films obtained from polyethylene, polypropylene and polybutene-1 and yield compositions of outstanding brightness and stability to ultraviolet radiation.

The chlorinated naphthotriazole brighteners utilized for preparing the polyalkylene compositions of the present invention are characterized by the following general formula:

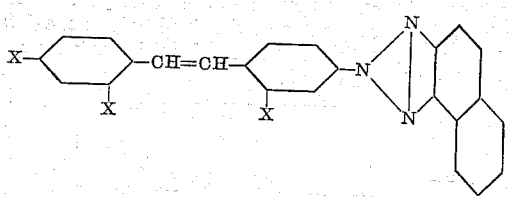

wherein X represents either hydrogen or chlorine, at least one of the X's being chlorine.

The naphthotriazoles having the foregoing general formula are prepared by dissolving a stilbenamine of the formula:

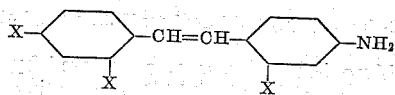

wherein X has the same value as above, in glacial acetic acid, and diazotizing by adding hydrochloric acid and sodium nitrite. After diazotization is complete, 2-naphthylamine, as the hydrochloride or as a slurry, is added to the diazo in equimolar amount. After coupling has occurred, the monazo dye is oxidized to the triazole, for example, by heating with copper sulfate in a basic sol-
vent such as pyridine or picoline. The brightener is isolated by first precipitating and filtering the copper as the sulfide and then separating from the solvent either by steam distillation or by dilution with water, and cooling, and then filtering. The brightening agent is applied to the fabric in a dispersed form. The dispersion may be made by kneading the brightener with a suitable dispersing agent in a Werner-Pfleiderer mixer, or it may be dispersed by dissolving the brightener in a suitable solvent and pouring the solution into water giving a finely divided precipitate. The dispersed brightener is usually applied to the fabric by heating in water together with the fabric for about 45 minutes at a temperature near the boil. The amount of brightener may vary a great deal and in fact may range from 0.0035% to 0.5% based on the weight of the fiber. Alternatively, the brightener may be incorporated directly into the plastic employing well known melt methods of incorporation.

The chloro-4-stilbeneamines are prepared in conventional manner by reduction of the corresponding chloro-4-nitrostilbenes.

The following examples will illustrate how the fluorescent naphthotriazoles are prepared and applied to synthetic fibers.

EXAMPLE I

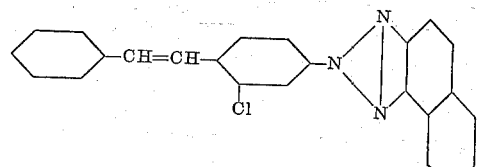

2-(3-chloro-4-styrylphenyl)-2H-naphtho[1,2]triazole

The intermediate having the formula:

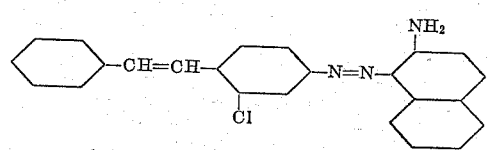

was prepared by mixing 26.7 grams of 2-chloro-4-stilbeneamine (0.116 mol.) (prepared by reduction of 2-chloro-4-nitrostilbene, described in Berichte 41, 2291–7) with 600 mls. of glacial acetic acid and heating the mixture to 95° C. To the hot solution were added 56 mls. of concentrated hydrochloric acid in 200 mls. of water. The material was cooled to 5° C. and 82 mls. of 10% aqueous sodium nitrite (wt./vol.) were added dropwise keeping the temperature below 10° C. The precipitate of amine hydrochloride became a clear solution after addition of the sodium nitrite. Stirring at not above 10° C. was continued for ½ hour, followed by addition of 6 mls. of 10% aqueous sulfonic acid.

Meanwhile, 16.8 grams of 2-naphthylamine (0.117 mol.) was dissolved in 400 mls. of water and 12 mls. of concentrated hydrochloric acid. After it had dissolved, the coupler was clarified. The coupler solution was added to the diazo, allowing the temperature to rise to 10–15° C. and stirred for 6 hours at 15° C. until a test for diazo and diazoamino was negative. The material was filtered and washed with 800 mls. of water.

*Oxidation of the intermediate*

The presscake of dye was mixed with 1200 mls of picoline and heated to solution. At 95° C. a solution of 80 grams of copper sulfate in 200 mls. water was added and the material refluxed with stirring at 95° C. for ½ hour. The cuprous and cupric copper was converted to sulfide by addition of 290 mls. of 20% (wt./vol.) aqueous sodium sulfide solution. The stirring was continued for 1 hour at 95° C., the material filtered and the copper sulfide cake washed with 1400 mls. of picoline preheated to 95° C. The filtrate was diluted to a volume of 4 liters, cooled to 30° C. and filtered. The cake was washed with 200 mls. of picoline and finally with 500 mls. of water. The cake was reslurried in 400 mls. of water, filtered and washed with water. The presscake was dried at 80° C. to give the desired brightener compound 2-(3-chloro-4-styrylphenyl)-2H-naphtho[1,2]triazole.

*Application*

50 milligrams of the 2-(3-chloro-4-styrylphenyl)-2H-naphtho[1,2]triazole were dissolved in 100 mls. of dimethyl formamide. 1.0 mls. of the resulting solution was added to 150 mls. of 0.1% "Peregal O" solution (commercially available ethylene oxide condensation product as a dispersing agent). This total formulation was poured into a launderometer jar together with a 5.0 gram swatch of Avisun polypropylene fabric (American Viscose Corp.) together with 10 steel balls. The material was heated at 190–200° F. for 45 minutes. The swatch was removed, rinsed and dried. The brightness of the dyed cloth was then read on an ultraviolet fluorescence photometer. The brightness reading of the dyed fabric, dyed at 0.01% concentration on the weight of the fiber was 36.

EXAMPLE II

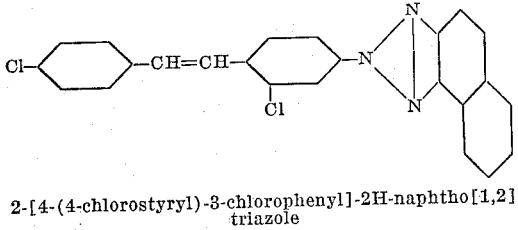

2-[4-(4-chlorostyryl)-3-chlorophenyl]-2H-naphtho[1,2] triazole

This compound was produced in the same sequence of reactions as in Example I, except that 0.116 mole of 2,4'-dichloro-4-stilbeneamine was substituted for the 2-chloro-4-stilbeneamine of Example I. The series of reactions is as follows:

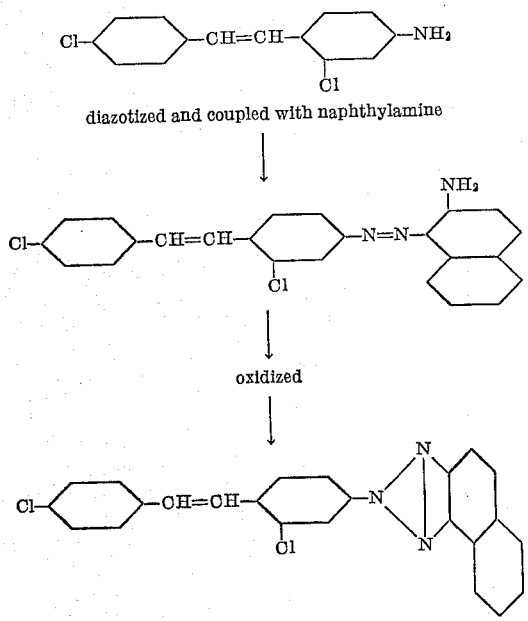

In the above, the 2,4'-dichloro-4-stilbeneamine was produced by reduction of 2,4'-dichloro-4-nitrostilbene in conventional manner as follows:

200 mls. of water, 35 grams of iron borings and 4 mls. of concentrated hydrochloric acid were slurried for 10 minutes at 95° C. Over a period of ¾ hour a hot solution of 23 grams of 2,4'-dichloro-4-nitrostilbene in 200 mls. of dimethyl formamide were added. The charge was stirred for 1 hour at 95° C. and 10 grams of sodium carbonate added to raise the pH to 9. The material was clarified by filtration at 90° C. The iron cake was washed with 250 mls. of dimethyl formamide. The filtrates were combined and treated with concentrated hydrochloric acid until acid to Congo paper. The precipitate which formed was filtered, washed with 300 mls. of cold water and dried at 80° C. to give 2,4'-dichloro-4-stilbeneamine hydrochloride. The diazotization and coupling of this product with 2-naphthylamine was carried out as in Example I, using an equivalent amount of 2,4'-dichloro-4-stilbeneamine for the 2-chloro-4-stilbeneamine of Example I. Oxidation to the corresponding triazole followed, according to the method of Example I.

In a manner similar to Example I, under Application, a dyeing with the foregoing brightener was made while employing a 5-gram swatch of low pressure polyethylene fabric instead of polypropylene. In this case a much improved brightness reading was obtained over a similar but untreated swatch of low pressure polyethylene.

EXAMPLE III

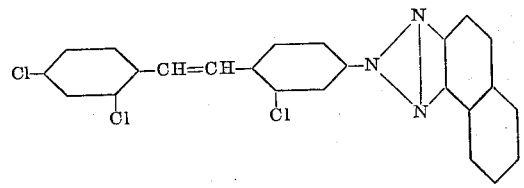

2-[4-(2,4-dichlorostyryl)-3-chlorophenyl]-2H-naphtho[1,2] triazole 2,2',4'-trichloro-4-nitrostilbene was prepared by the method of Ullman (Berichte 41, 2296) substituting an equivalent amount of 2,4-dichlorobenzaldehyde for benzaldehyde in the process of condensing 2-chloro-4-nitrotoluene with benzaldehyde in the presence of piperidine. The compound was reduced to 2,2',4'-trichloro-4-stilbeneamine in the same manner as the reduction of 2-chloro-4-nitrostilbene in Example I. The 2,2',4'-trichloro-4-stilbeneamine was diazotized and coupled with 2-naphthylamine, then oxidized with copper sulfate by the method described in Example I.

In a manner similar to Example I, under application, a dyeing of the foregoing brightener was made on a 5-gram swatch of polyethylene fabric instead of polypropylene. A much improved brightness reading was obtained over a similar but untreated piece of polyethylene fabric.

The dyeing was again repeated with the exception that a 5-gram swatch of polybutene-1 was employed. A comparative brightness reading of the dyed polybutene-1 fabric, in contrast to the untreated fabric, indicated a great improvement in brightness.

EXAMPLE IV

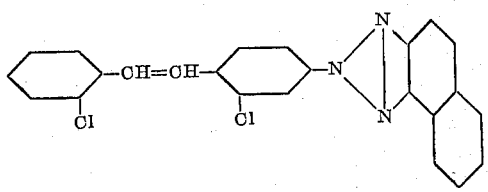

2-[4-(2-chorostyryl)-3-chlorophenyl]-2H-naphtho[1,2] triazole 2,2'-dichloro-4-nitrostilbene was prepared by the Ullman method (Berichte 41, 2296) substituting an equivalent amount of o-chloro-benzaldehyde for benzaldehyde in the process of condensing 2-chloro-4-nitrotoluene with benzaldehyde in the presence of piperidine. The compound was then reduced to the corresponding amine according to the method of reducing the 2-chloro-4-nitrostilbene to the corresponding amine as in Example I. The amine was then diazotized and coupled with 2-naphthylamine, then oxidized to 2-[4-(2-chlorostyryl)-3-chlorophenyl]-2H-naphthol[1,2]triazole according to the method described in Example I.

The brightener when applied to a 5-gram swatch of low pressure polyethylene fabric as in Example I, under Application, only in this case using 0.5% by weight of fiber of brightener, displayed a much improved brightness reading than that obtained from a similar but untreated piece of polyethylene fabric.

EXAMPLE V

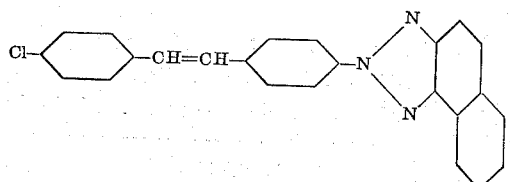

2-[4-(4-chlorostyryl)phenyl]-2H-naphtho[1,2]triazole

4'-chloro-4-nitrostilbene was prepared by the method of Ullman (Berichte 41, 2296) substituting 4-chlorobenzaldehyde for benzaldehyde in the process of condensing 4-chlorobenzaldehyde for benzaldehyde in the process of condensing 4-nitrotoluene with benzaldehyde in the presence of piperidine. The compound was reduced to 4'-chloro-4-aminostilbeneamine in the same manner as the reduction of 2-chloro-4-nitrostilbene in Example I. The 4'-chloro-4-stilbeneamine was diazotized and coupled with 2-naphthylamine, then oxidized with copper sulfate by the method described in Example I.

The brightener when applied to a 5-gram swatch of low pressure polyethylene fabric as in Example I, under Application, displayed a much improved brightness reading than that obtained from a similar but untreated piece of polyethylene fabric.

EXAMPLE VI

2-[4-(2-chlorostyryl)phenyl]-2H-naphtho[1,2]triazole

2'-chloro-4-nitrostilbene was prepared by the method of Ullman (Berichte 41, 2296) substituting 2-chlorobenzaldehyde for benzaldehyde in the process of condensing 4-nitrotoluene with benzaldehyde in the presence of piperidine. The compound was reduced to 2'-chloro-4-aminostilbene in the same manner as the reduction of 2-chloro-4-nitrostilbene in Example I. The 2'-chloro-4-stilbeneamine was diazotized and coupled with 2-naphthylamine, then oxidized with copper sulfate by the method described in Example I.

The brightener thus formed was applied to a 5-gram swatch of low pressure polyethylene fabric as in Example I, under Application. The treated fabric showed a much improved brightness reading than that obtained from a similar but untreated piece of polyethylene fabric.

EXAMPLE VII 0.1 part by weight of the brightener compound of Example I was milled with 100 parts by weight of a high density polyethylene resin commercially available under the name of Fortiflex A-70 (density 0.96) on a two-roll mill at 120° C. until uniform. While still hot, the batch was passed through a two-roll cold mill to obtain a rough sheet of polyethylene. A small piece was cut and pressed between two aluminum sheets on a Carver press at approximately 110° C. to a film having an approximate thickness of 6 mils. The film appeared whiter and brighter than a similar film prepared without the brightener.

In producing dyeings by the melt method, while employing the chlorinated naphthotriazole brightener, the polyalkylene plastic, polyethylene, polypropylene or polybutene-1 is melted to its melting point on a two-roll heated roller, .0035–0.5% of brightener is mixed into the melt, and then the molten mass is either extruded through a fiber forming spinneret and cooled to solidification, or it may be formed into a film in conventional manner. This method is particularly useful in dyeing low molecular weight polyolefins.

However, the instant chlorinated naphthotriazole brighteners are particularly valuable in that they can be applied to polyolefin fibers in a dyebath employing regular dyeing equipment. The preferred method of applying the brightener is to dissolve it in a suitable organic solvent which is then dissolved or dispersed in water. A surfactant or other dyeing assistant may be added. The fiber is dyed in this solution at or near the boil, generally from about 10–60 minutes, followed by rinsing and drying.

The solvent which may be used may be any suitable water-soluble solvent which is capable of dissolving the brightener, e.g., dimethyl, formamide, alcohols such as ethanol, glycol, diethylene glycol, glycerine glycol, mono-methyl-, monoethyl- or monobutyl-ether and the like, based on the weight of the fiber. The amount of brightener ranges from approximately .0035–0.5% by weight of the polyalkylene plastic.

It is furthermore possible, if desired, to treat the fabric with a combination of a dye and brightener in the same bath. In this case a suitable dye soultion is made up, a brightener solution of desired strength is added, and dyeing is carried out in usual manner.

From the foregoing specification it is clearly manifest that the amount of the chlorinated naphthotriazole brightener to be employed in the polyalkylene plastic, i.e., sheet or film, fiber or fabric, may vary from 0.0035 to 0.5% based on the weight of the polyalkylene plastic.

By the term "polyalkylene plastic" as employed in the appended claims, is intended to include sheets, films, fibers or fabrics of α-olefin polymers, i.e., polyethylene, polypropylene and polybutene.

We claim:
1. A polyalkylene plastic composition containing, in an amount sufficient to optically brighten said plastic, a brightening agent having the following formula:

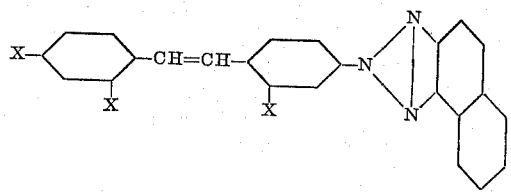

wherein X represents a member selected from the class consisting of hydrogen and chlorine, at least one of the Xs in the outer ring being chlorine.

2. A polyalkylene plastic composition containing, in an amount sufficient to optically brighten said plastic, a brightening agent having the following formula:

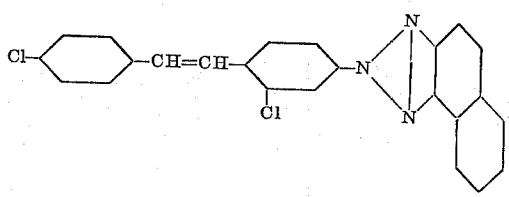

3. A polyalkylene plastic composition containing, in an amount sufficient to optically brighten said plastic, a brightening agent having the following formula:

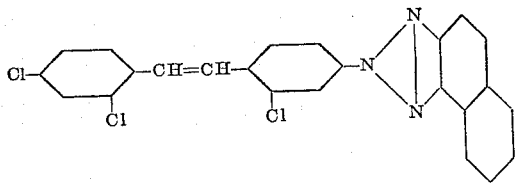

4. A polyalkylene plastic composition containing, in an amount sufficient to optically brighten said plastic, a brightening agent having the following formula:

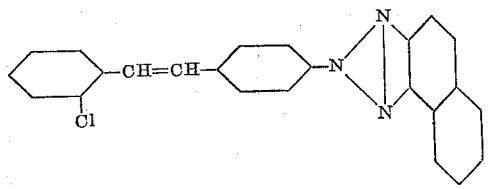

5. A polyalkylene plastic composition containing, in an amount sufficient to optically brighten said plastic, a brightening agent having the following formula:

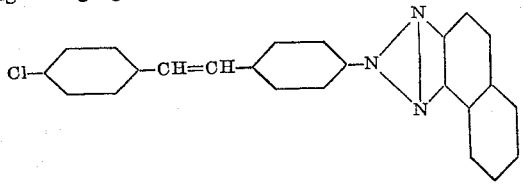

6. A polyalkylene plastic composition containing, in an amount sufficient to optically brighten said plastic, a brightening agent having the following formula:

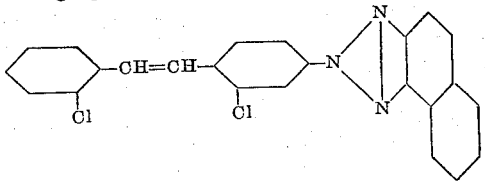

References Cited by the Examiner

UNITED STATES PATENTS

| | | | |
|---|---|---|---|
| 2,972,611 | 2/1961 | Zweidler et al. | 252—301.2 |
| 3,062,814 | 11/1962 | Buell | 252—301.2 |

FOREIGN PATENTS 1,262,740  4/1961  France.

TOBIAS E. LEVOW, *Primary Examiner.*

HELEN M. McCARTHY, *Examiner.*

R. D. EDMONDS, *Assistant Examiner.*